United States Patent
Friess et al.

(10) Patent No.: US 8,268,438 B2
(45) Date of Patent: Sep. 18, 2012

(54) COMPONENT FOR USE IN STREAMS OF HOT GAS

(75) Inventors: Martin Friess, Frickenhausen-Linsenhofen (DE); Markus Keck, Stuttgart (DE)

(73) Assignee: Deutsches Zentrum fuer Luft—und Raumfahrt e.V., Cologne (DE)

( * ) Notice: Subject to any disclaimer, the term of this patent is extended or adjusted under 35 U.S.C. 154(b) by 419 days.

(21) Appl. No.: 12/717,640

(22) Filed: Mar. 4, 2010

(65) Prior Publication Data
US 2010/0223906 A1    Sep. 9, 2010

(30) Foreign Application Priority Data
Mar. 6, 2009 (DE) .......... 10 2009 013 150

(51) Int. Cl.
  *B32B 7/02*  (2006.01)
  *F02K 1/00*  (2006.01)
  *F04D 29/30*  (2006.01)
(52) U.S. Cl. ....... 428/212; 60/230; 415/200; 415/208.2; 415/209.2; 415/209.3
(58) Field of Classification Search ............ 60/230
See application file for complete search history.

(56) References Cited

U.S. PATENT DOCUMENTS

| | | | |
|---|---|---|---|
| 6,460,807 B1 | 10/2002 | Braitinger et al. | |
| 8,147,206 B2 * | 4/2012 | Heidenreich et al. | 416/230 |
| 2006/0283014 A1 * | 12/2006 | Subramanian et al. | 29/889.71 |
| 2007/0119151 A1 | 5/2007 | McAllister et al. | |

FOREIGN PATENT DOCUMENTS

| | | |
|---|---|---|
| DE | 37 38 107 C1 | 6/1989 |
| DE | 198 56 597 A1 | 4/2000 |
| DE | 101 43 015 A1 | 3/2003 |
| EP | 0 878 688 A1 | 11/1998 |
| WO | WO 2005/028844 A1 | 3/2005 |
| WO | WO 2006/010502 A2 | 2/2006 |

\* cited by examiner

*Primary Examiner* — David Sample
*Assistant Examiner* — Nicole T Gugliotta
(74) *Attorney, Agent, or Firm* — Womble Carlyle Sandridge & Rice, LLP

(57) ABSTRACT

The present application provides a component for use in streams of hot gas, which comprises a first region of fiber-ceramic material, a second region of fiber-ceramic material and a middle layer of fiber-ceramic material which is arranged between the first region and the second region, wherein the fiber-ceramic material of the middle layer has a lower ceramic content than the fiber-ceramic material of the first region and the second region, and wherein at least one acute-angled in-flow edge and/or away-flow edge of the component is formed on the middle layer.

23 Claims, 5 Drawing Sheets

COMPONENT FOR USE IN STREAMS OF HOT GAS

CROSS-REFERENCE TO RELATED APPLICATIONS

The present disclosure claims priority to German application number DE 10 2009 013 150.7, filed Mar. 6, 2009, which is incorporated herein by reference in its entirety and for all purposes.

FIELD OF THE INVENTION

The invention relates to a component for use in streams of hot gas.

BACKGROUND OF THE INVENTION

Components in the engines of flying objects such as jet vanes for instance are subjected to streams of hot gas. Jet vanes are also referred to as jet flaps or control rudders. They are arranged in the proximity of the outlet end of a jet in a flying object and serve to control the stream of hot gas immediately before it is emitted in order to steer the flying object.

Streams of hot gas frequently contain particles especially when solid fuels are being employed. A component being subjected to a stream of hot gas such as a jet vane for example is therefore regularly loaded in both an aerodynamic sense and by the impact of abrasive and/or corrosive particles.

From WO 2006/010502 A2, there is known a jet vane for use in streams of hot gas which comprises a vane, wherein the vane is made of a fiber-reinforced ceramic material, the fiber-reinforced ceramic material is made by means of continuous fabric layers and the material for a core portion of the vane has a greater ceramic content than a cover portion on each side of the core portion.

SUMMARY OF THE INVENTION

In accordance with the invention, a component for use in streams of hot gas is provided, which is highly stable both in regard to aerodynamic as well as abrasive loads.

A component for use in streams of hot gas is provided. In accordance with an embodiment of the invention, the component comprises a first region of fiber-ceramic material, a second region of fiber-ceramic material and a middle layer of fiber-ceramic material which is arranged between the first region and the second region, wherein the fiber-ceramic material of the middle layer has a lower ceramic content than the fiber-ceramic material of the first region and the second region, and wherein at least one acute-angled in-flow edge and/or away-flow edge of the component is formed on the middle layer.

The ceramic content affects those properties of a fiber-ceramic material which are relevant to its usage in streams of hot gas. An increase in the ceramic content is associated with an increase in the abrasion and corrosion resistance of the material on the one hand, but with a decrease in the mechanical strength of the material, and in particular, the compressive and tensile strength thereof on the other. However, a high degree of mechanical strength is a pre-requisite for high stability in regard to aerodynamic loads.

Due to its relatively high mechanical strength, the middle layer of the component in accordance with the invention can serve advantageously as an aerodynamic load-bearing layer of the component. On the other hand however, the component is protected from damage due to the effects of abrasion and corrosion by the choice of the material for the first and the second region between which the middle layer is arranged.

In-flow edges and away-flow edges are edges via which the two flow guidance surfaces of the component, over which the stream of hot gas flows when the component is in use, are connected. Two flow guidance surfaces can meet one another directly at an angle so that the edge has a finite longitudinal extent, but not a finite transverse extent in a direction transverse to the longitudinal extent thereof. The angle at which the flow guidance surfaces meet one another defines the edge angle in this case.

However, two flow guidance surfaces could also be connected together by a separate surface section of the component. The edge is then formed by this surface section and has both a finite longitudinal extent and a finite transverse extent in a direction transverse to the longitudinal extent. The edge angle here, is then defined as the angle which is formed in a plane perpendicular to the longitudinal extent of the edge between the tangential planes of the flow guidance surfaces at the points at which they respectively adjoin the edge. In particular, rounded-off edges also have a finite transverse extent.

When using the component in the intended manner, this is aligned in such a way that an in-flow edge points in a direction which is substantially opposite to the direction of flow of the stream of hot gas, whilst an away-flow edge points in a direction that is substantially parallel to the direction of flow of the stream of hot gas.

In accordance with the invention, at least one acute-angled in-flow edge and/or away-flow edge of the component, i.e. at least one in-flow edge and/or away-flow edge having an acute edge angle, is formed on the middle layer.

Due to this form of construction, the stability of the component at the at least one in-flow edge and/or away-flow edge is increased. In particular, the likelihood of break-away at this at least one edge is reduced, this being a phenomenon which is frequently observed in streams of hot gas and is something which can lead to general inoperability of the component.

Break-away at an acute-angled in-flow edge or away-flow edge occurs more rarely if the material of the region, at which this edge is formed, is carefully optimized in regard to its mechanical strength, as is the case for the middle layer. In particular, for the prevention of break-away to as great an extent as possible, a high degree of mechanical strength in the region of the edge is of relatively greater importance than a high degree of abrasion resistance.

The formation of an edge on the middle layer in the case of an away-flow edge has a particularly helpful effect since such an edge is exposed to smaller abrasive loads compared with an in-flow edge and so here, the relatively small abrasion resistance of the middle layer is much less of a disadvantage.

It is expedient, if the at least one in-flow edge and/or away-flow edge is formed on the middle layer over at least part of its finite longitudinal extent.

It is particularly expedient, if the at least one in-flow edge and/or away-flow edge is formed on the middle layer over its entire longitudinal extent.

It is preferred that the at least one in-flow edge and/or away-flow edge should have a finite transverse extent in a direction transverse to its longitudinal extent. In particular, the at least one in-flow edge and/or away-flow edge can be formed such that it is rounded-off. In comparison with edges not having a finite transverse extent, edges having a finite transverse extent exhibit increased stability in regard to the abrasive and corrosive loads occurring in a stream of hot gas.

If the at least one in-flow edge and/or away-flow edge has a finite transverse extent, then it is expedient for it to be formed on the middle layer over at least a part of this transverse extent.

It is particularly expedient, if the at least one in-flow edge and/or away-flow edge is formed on the middle layer over its entire transverse extent.

In particular, it is envisaged that the at least one in-flow edge and/or away-flow edge be formed on the middle layer over its entire transverse extent and also that at least a near-edge section of a flow guidance surface of the component bordering on the at least one in-flow edge and/or away-flow edge be formed on the middle layer. In this case, the effect is achieved that there will be a particularly large decrease in the likelihood of break-away at the at least one in-flow edge and/or away-flow edge.

It is expedient if the running direction of the middle layer is parallel to the longitudinal extent of the at least one in-flow edge and/or away-flow edge. Then the at least one in-flow edge and/or away-flow edge can be specifically formed on the middle layer especially over the entire longitudinal extent thereof, whereas other regions, the first or second region for example, of the flow guidance surfaces can be formed for the most part of fiber-ceramic material and can thus be optimized in regard to the abrasion resistance thereof.

Advantageously, the bisector of the edge angle of at least one in-flow edge and/or away-flow edge lies within the component in the middle layer. In a structure of this type, the middle layer is in the form of an aerodynamic load-bearing layer and can make a particularly large contribution to an increase in the stability of the component. In particular, a structure of this type makes it possible for each of two mutually opposite in-flow edges and/or away-flow edges of the component to be formed on the middle layer.

A simple construction for the component is obtained, if the bisector of the edge angle of at least one in-flow edge and/or away-flow edge runs in a middle plane of the component that extends in parallel with the longitudinal extent of this at least one in-flow edge and/or away-flow edge.

A preferred form of construction for the component consisting of regions of fiber-ceramic material is one wherein it is mirror-symmetrical with respect to the middle plane. In particular, layers of fiber-ceramic material such as the middle layer are also to be considered as being regions of fiber-ceramic material. The mirror symmetry is to be determined from a macroscopic point of view, i.e. with respect to the shape, the mutual arrangement of and the type of material in the regions, but not with respect to the fine structure thereof nor the exact composition of the materials from which it is made.

In a preferred embodiment of the component in accordance with the invention, the first region and/or the second region are in the form of layers of fiber-ceramic material. The component then has a layered construction; this can comprise further layers apart from the middle layer and the layers forming the first and the second regions.

It is advantageous if the component comprises at least one intermediate layer of fiber-ceramic material which is directly bounded on a first and a second side by a respective layer of fiber-ceramic material, wherein the ceramic content of the fiber-ceramic material of the intermediate layer lies between the ceramic content of the layer bordering on the first side and the ceramic content of the layer bordering on the second side. Due to this form of grading, a strong bond between the layers is obtained, this thereby contributing to the high stability of the component.

It is expedient if the component has a layered structure consisting of layers of fiber-ceramic material in which, in a direction of superposition of the layers, there are arranged, in an alternating manner, layers in each case of a fiber-ceramic material having a relatively high ceramic content and layers in each case of a fiber-ceramic material having a relatively low ceramic content. Relatively high ceramic contents for the materials of a first number of layers and relatively low ceramic contents for the materials of a second number of layers are obtained if the material of each layer in the first number has a higher ceramic content than the material of each layer in the second number. The durability of the component is increased by this measure. As a general rule, an increase in the number of layers consisting of fiber-ceramic materials having a relatively high and a relatively small ceramic content which are arranged alternately over a given extent of the component in the direction of superposition will lead to an improvement in the stability of the component. Thereby, one or more of the intermediate layers described above can also be provided between a layer of a fiber-ceramic material having a relatively high ceramic content and a neighboring layer of a fiber-ceramic material having a relatively low ceramic content.

It is advantageous for the component to have a covering layer of fiber-ceramic material, wherein the fiber-ceramic material of the covering layer has a higher ceramic content than the fiber-ceramic material of the middle layer. A large number of the corrosive and abrasive particles in a stream of hot gas strikes the covering layer of which an extensive surface of the component is formed, and it is for this reason that it is expedient for the fiber-ceramic material of which it is made to have a high ceramic content and thus a high degree of abrasion resistance.

The construction of the component consisting of different regions, i.e. including especially the layers, and that of the respective fiber-ceramic materials thereof are determined in dependence on the temperature requirements and the loadings imposed by the stream of hot gas in the particularly envisaged field of operation.

It is preferred that the fiber-ceramic material in at least one region should be or should comprise a carbide ceramic material.

Furthermore, it is preferred that the fiber-ceramic material in at least one region should contain C fibers (carbon fibers) or SiC fibers (silicon carbide fibers).

In particular, the fiber-ceramic material in the at least one region is or comprises a C/C-SiC material or a SiC/SiC material.

A fiber-ceramic material comprising carbon fibers in a matrix consisting of carbon and silicon carbide is referred to as a C/C-SiC material. In order to produce such a material, carbon fibers are firstly embedded in a matrix consisting of a carbon-containing matrix polymer. Thereafter, a carbon matrix is produced by pyrolysis of the matrix polymer. In a subsequent process wherein liquid silicon is added thereto, it forms silicon carbide with part of the carbon in the carbon matrix so that a matrix containing carbon and silicon carbide results from a ceramizing process. This procedure is also called a "Liquid Silicon Infiltration" process (LSI process).

When using an LSI process, the strength of the bonding of the carbon fibers to the carbon-containing matrix polymer can be affected by means of a thermal pre-treatment of the carbon fibers. The weaker this bond, so proportionately greater is the detachment of the carbon matrix from the fibers after pyrolysis. If such a detachment process has taken place to a great extent, then large regions of the pyrolysed body are accessible to the liquid silicon during the ceramizing process so that a high silicon carbide content and concomitantly a high ceramic content will be obtained. In consequence, the ceramic content of the C/C-SiC material is adjustable by means of a thermal pre-treatment of the carbon fibers.

A SiC/SiC material consists of silicon carbide fibers in a silicon carbide matrix. It can be made by deposition of a silicon carbide matrix from a gaseous precursor component of silicon carbide fibers in a so called "Chemical Vapor Infiltration" process (CVI process).

Advantageously, the middle layer consists of a C/C-SiC-XB material. This type of material has a low ceramic content and thus a high mechanical strength.

Furthermore, the first region and/or the second region advantageously consists of a C/C-SiC-XD material. This type of material has a high ceramic content and a high abrasion resistance.

With respect to their ceramic content, C/C-SiC-XT materials and C/C-SiC-XC materials lie between a C/C-SiC-XB material and a C/C-SiC-XD material. These, for example, can be used for intermediate layers located between a layer consisting of a C/C-SiC-XB material and a layer consisting of a C/C-SiC-XD material.

Provision may also be made for the fiber-ceramic material in at least one region to be made at least partially of a biomorphic material. For example, a preliminary stage material can be made from a mixture of a cellulose-containing powder and a bonding agent by hardening the bonding agent and the material can subsequently be converted into a SiC material by pyrolysis and a ceramizing process.

It is advantageous, if the fiber-ceramic material in at least one region contains fibers which are arranged in the form of a felt, a fleece, a lap roll, a scrim, a woven fabric or a braiding. During the production of the component, a semi-finished fiber product in which the fibers are arranged in the requisite structure can then be used.

Preferably, the component is in the form of a jet vane. However, the component could be any other type of component that is provided with at least one in-flow edge and/or away-flow edge which is intended to be used in a stream of hot gas, such as one for use in a rocket engine for example or else in a power plant particularly in its boiler area.

The production of the component in accordance with the invention can, for example, be effected by means of an autoclave process, a pressing type process or a "Resin Transfer Moulding" process (RTM process). By using the aforesaid processes, one can obtain a pre-form comprising fibers embedded in a matrix polymer. The pre-form can have a defined construction consisting of different regions, and in particular, a layered structure, wherein differing materials can be used for the different regions. Subsequently, the pre-form can be subjected to the steps of pyrolysis and the ceramizing effect of an LSI process for the purposes of producing the fiber-ceramic material of the component as a whole. After the ceramizing process, the desired shape of the component can be obtained in a subsequent process such as a grinding or a milling process.

In an autoclave process, semi-finished fiber products impregnated with a liquid matrix component are arranged with the desired structure in an autoclave in which the matrix component is subsequently hardened to form the matrix polymer.

In the case of a pressing-type process too, one commences with semi-finished fiber products impregnated with a liquid matrix component which are arranged with the desired structure. In this case however, the process of hardening the matrix component to form the matrix polymer is effected in a mould.

A pressing-type process for the production of a jet vane is described in WO 2006/010502 A2 for example.

In an RTM process, the semi-finished fiber products having the desired structure are placed in an infiltration mould. The infiltration mould is closed before a liquid matrix component is fed into it. The matrix component then impregnates the semi-finished fiber products and is hardened in the infiltration mould.

Due to the hardening process occurring in each of the processes described above, a firm bond between the different regions of the pre-form is obtained.

In particular, semi-finished fiber products consisting of carbon fibers, which differ in regard to the thermal pre-treatment of the fibers, can be used for the different regions of the pre-form in the processes described above. This leads to differences in the strength of the bonding of the fibers to the matrix polymer, and it is for this reason that regions of the pre-form having different ceramic contents are obtained after the pyrolysis and the ceramizing processes have been effected.

The number and shape of the regions of fiber-ceramic material in the component in accordance with the invention and in particular too, the thickness of layers of fiber-ceramic material can thus be determined by an appropriate selection of the semi-finished fiber products which are used for the production of the pre-form.

The following description of preferred embodiments taken in conjunction with the drawings serves to provide a more detailed explanation of the invention.

DETAILED DESCRIPTION OF THE INVENTION

Figure 1:
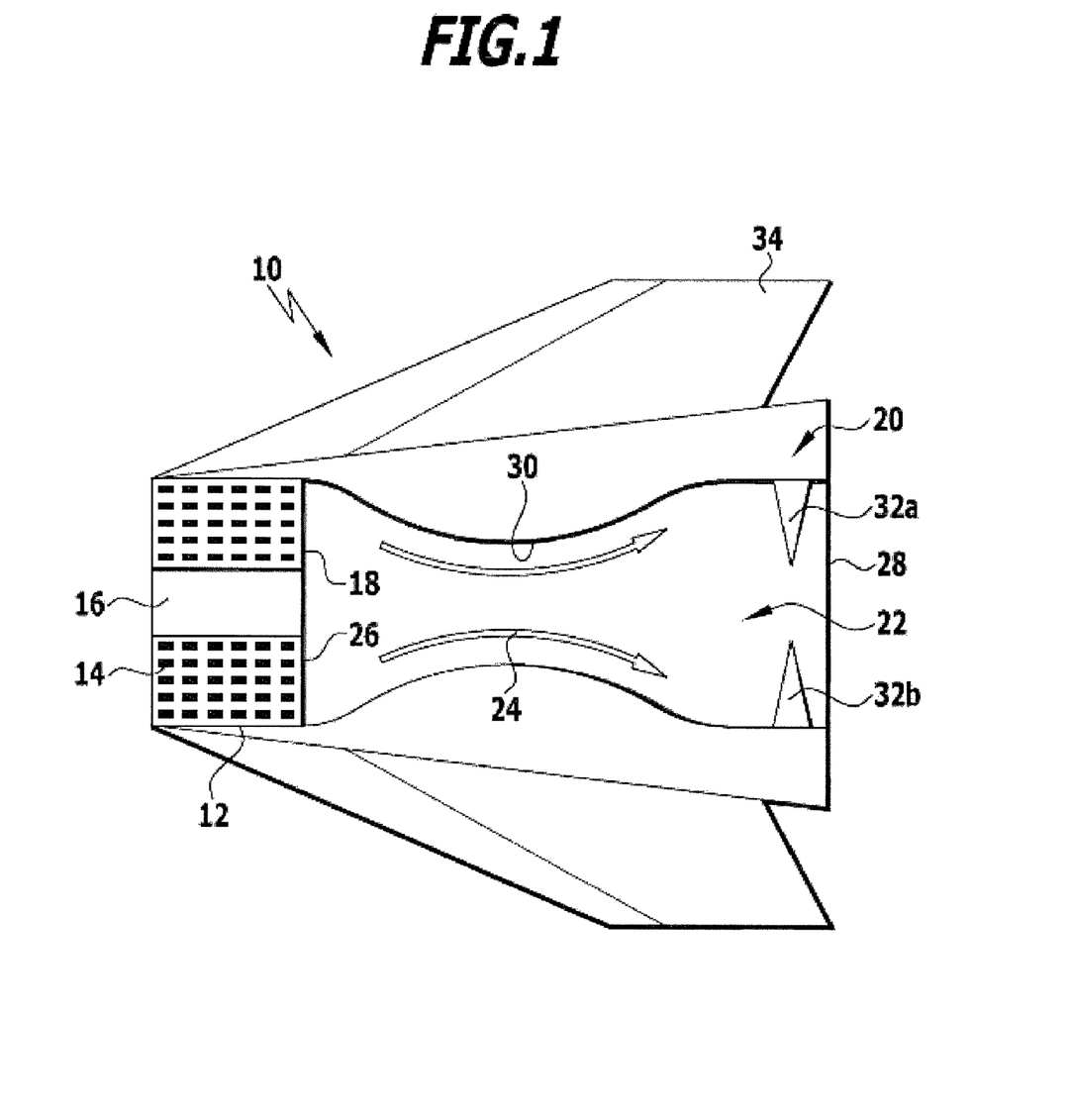
FIG. 1 shows a schematic illustration of an exemplary embodiment of an engine for a flying object which is provided with jet vanes.

FIG. 1 shows an exemplary embodiment of an engine for a flying object which is referenced therein by 10. A propellant charge 14 incorporating a solid fuel is arranged in a housing 12 in the engine 10. The propellant charge 14 can be provided with a central channel 16.

A tail cone 20 in which a jet nozzle 22 is arranged is attached to the usually rear end 18 of the housing 12. In operation, a stream of hot gas 24, which is formed by combustion of the propellant charge 14, passes through this jet nozzle 22. The stream of hot gas 24 emerges from the housing 12 in the end region 18. Hereby, the stream of hot gas 24 enters at the propellant charge end 26 of the jet nozzle 22 and emerges into the surroundings from an outlet end 28 of the jet nozzle 22, wherein the jet nozzle 22 has a narrow portion 30 between the propellant charge end 26 and the outlet end 28.

Jet vanes 32a, 32b are provided close to the outlet end 28 of the jet nozzle 22. They serve to control the stream of hot gas 24 immediately prior to its expulsion from the outlet end 28 in order to steer the flying object provided with the engine 10.

The stream of hot gas 24 can convey particles therewith. Consequently, the jet vanes 32a, 32b in the stream of hot gas 24 are usually exposed to both aerodynamic loads and abrasive loads. The stability of the jet vanes 32a, 32b particularly in the regions thereof comprising an acute-angled in-flow edge or away-flow edge is crucial to the life time of the jet vanes 32a, 32b.

The tail cone 20 for example, comprises additional outer, flight-stabilizing air guidance surfaces 34 which are also referred to as fins.

Figure 2:
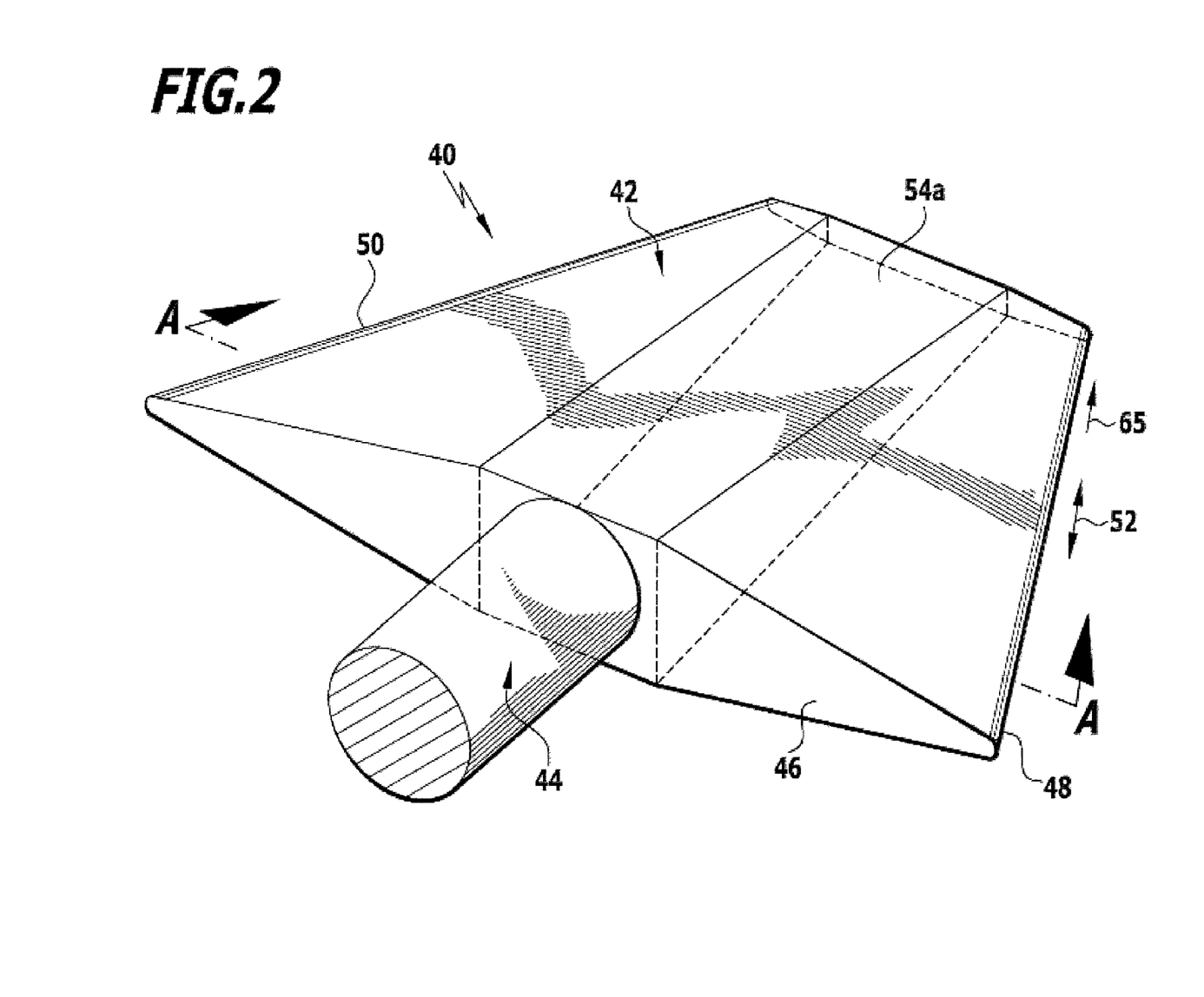
FIG. 2 shows a perspective illustration of an exemplary embodiment of a jet vane.

An exemplary embodiment of a jet vane in accordance with the invention, which is shown in FIG. 2 in the form of a perspective view and is referenced by 40 therein, comprises a vane 42 and a shaft 44 which is connected to the vane 42. The vane 42 is exposed to the stream of hot gas 24 when the flying object is operational. The jet vane 40 is mounted in rotatable manner in the jet nozzle 22 by means of the shaft 44. The shaft 44 thus serves as a fixing pin for fixing the vane 42 to the jet nozzle 22.

The geometry of the vane 42 of the jet vane 40 is approximately that of a frustum of a pyramid. A lower surface 46 of the vane, which corresponds to the base area of said approximate frustum of a pyramid, is approximately in the form of a hexagon that has been compressed perpendicularly relative to one of its sides.

At mutually opposite ends of the vane 42, an in-flow edge 48 and an away-flow edge 50 are formed between two neighboring side faces of the approximate frustum of a pyramid of the vane 42 which run together at an acute angle. At the in-flow edge 48, the angle between the side faces bordering thereon amounts to approximately 30° for example, and at the away-flow edge to approximately 25° for example. Both the in-flow edge and the away-flow edge are rounded off so that they are both areal and have a finite longitudinal extent as well as a finite transverse extent. The longitudinal extent 52 of the in-flow edge 48 is shown in FIG. 2.

Figure 3:
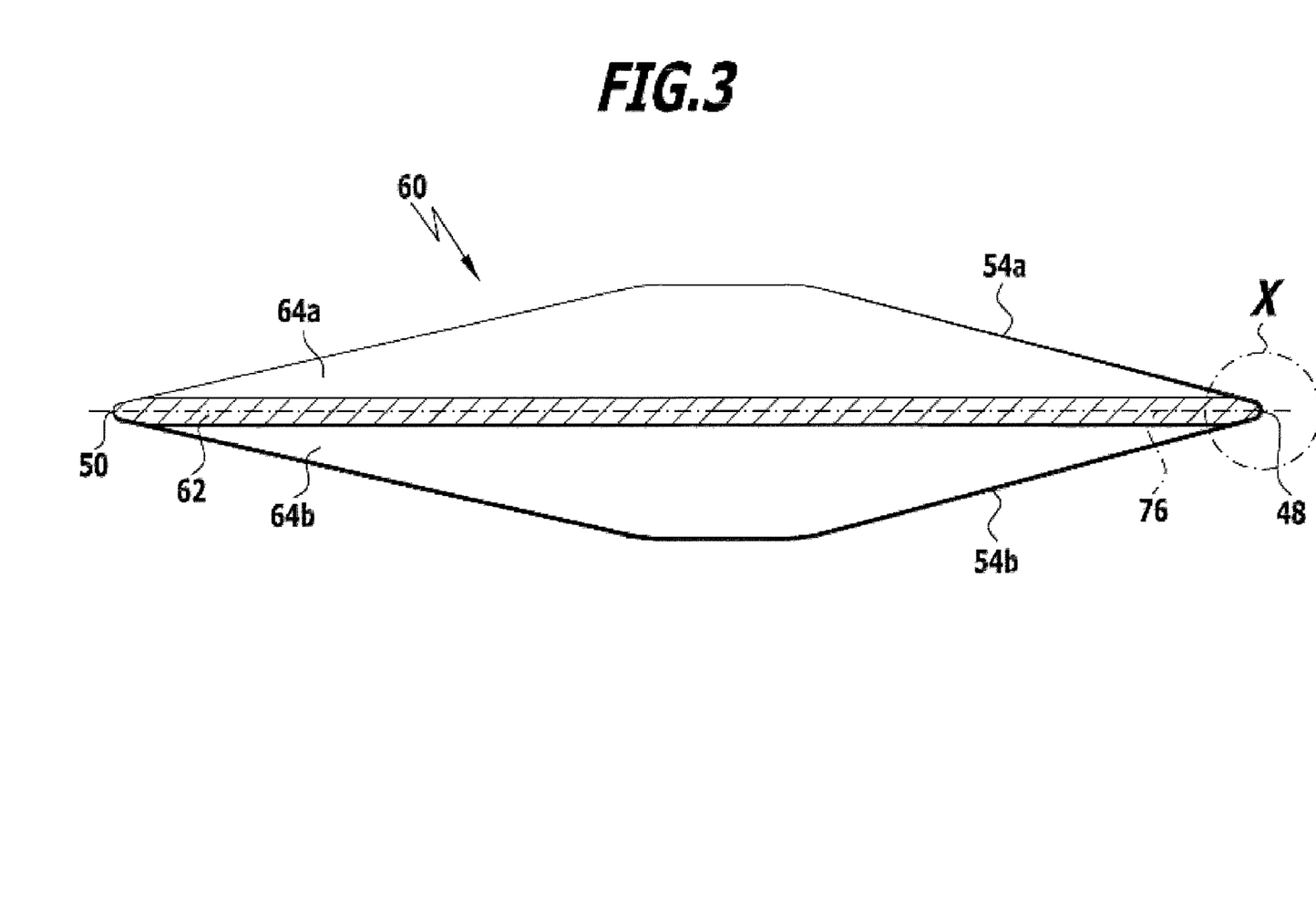
FIG. 3 shows a cross sectional view of a first exemplary embodiment of a jet vane in accordance with the invention which has a shape in accord with FIG. 2, along the line A-A in FIG. 2.

Two flow guidance surfaces of the vane 42, which are connected together by both the in-flow edge 48 and the away-flow edge 50 and of which, one flow guidance surface 54a is visible in FIG. 3, each comprise three neighboring side faces of the approximate frustum of a pyramid of the vane 42.

The orientation of the jet vane 40 in the stream of hot gas 24 is selected in such a way that the in-flow edge 48 points in a direction which is substantially opposite to the direction of flow of the stream of hot gas 24, whereas the away-flow edge 50 points in a direction which is substantially parallel to the direction of flow of the stream of hot gas 24.

The shaft 44 of the jet vane 40 is formed by means of a cylindrical element for example, wherein a base surface of the cylinder of the shaft 44 is arranged on the lower surface 46 of the vane 42 in a central position.

In FIG. 3, there is depicted a cross sectional view along the line A-A in FIG. 2 of a first exemplary embodiment of a jet vane 60 in accordance with the invention, this having the shape shown in FIG. 2. The elements already appearing in FIG. 2 are referenced in FIG. 3 by the same reference symbols as those used in FIG. 2.

The construction of the jet vane 60 consisting of different regions of fiber-ceramic material is apparent in this cross sectional view.

A middle layer 62 of fiber-ceramic material is arranged between a first region 64a of fiber-ceramic material and a second region 64b of fiber-ceramic material. The fiber-ceramic material of the middle layer of 62 has a lower ceramic content than the fiber-ceramic material of the first and the second region 64a, 64b. For example, the middle layer 62 consists of a C/C-SiC-XB material and the first and second regions 64a, 64b of a C/C-SiC-XD material.

The middle layer 62 runs in a plane and extends transversely through the jet vane 60. The running direction 65 of the middle layer 62 depicted in FIG. 2 is parallel to the longitudinal extent 52 of the in-flow edge 48; both the in-flow edge 48 and the away-flow edge 50 are formed on the middle layer 62.

The design of the jet vane 60 at the in-flow edge 48 is described in more detail hereinafter on the basis of the enlarged illustration shown in FIG. 4 of the region X in the cross sectional view depicted in FIG. 3. This explanation applies in corresponding manner to the region of the away-flow edge 50 insofar as no mention is made of any differences.

As previously mentioned, the in-flow edge 48 is a section of the surface of the jet vane 60 by means of which the two flow guidance surfaces 54a, 54b are connected together. It also has a finite transverse extent 66 in addition to its finite longitudinal extent 52. Its edge angle 68 is the angle which, in the plane of the cross sectional view in FIG. 4 that runs perpendicularly to the longitudinal extent 52 of the in-flow edge 48, is formed between the tangential planes 70a, 70b of the flow guidance surfaces 54a, 54b at the points 72a, 72b at which they respectively border onto the in-flow edge 48. Since, in the present case, the regions of the flow guidance surfaces 54a, 54b bordering on the in-flow edge 48 are each planar side faces of the approximate frustum of a pyramid of the vane 42, the edge angle 68 of the in-flow edge 48 corresponds here to the angle at which these side faces run into one another. It amounts to approximately 30°. The correspondingly defined edge angle of the away-flow edge 50 amounts to approximately 25°.

The in-flow edge 48 is formed on the middle layer 62 over both its entire longitudinal extent 52 and its entire transverse extent 66. Moreover, the near-edge sections 74a, 74b of the flow guidance surfaces 54a, 54b connected to one another by the in-flow edge 48 are also formed on the middle layer 62.

The edge angle 68 of the in-flow edge 48 has a bisector 76 which is located in the middle layer 62 within the jet vane 60. This bisector 76 runs in a middle plane of the jet vane 60 running parallel to the longitudinal extent 52 of the in-flow edge 48, the construction of the jet vane 60 consisting of regions of fiber-ceramic material being mirror-symmetrical with respect to said middle plane thus resulting in a simple construction. The bisector 76 of the edge angle 68 of the in-flow edge 48 is also the bisector of the edge angle of the away-flow edge 50.

In this structure, the surface sections of the jet vane 60 forming the in-flow edge 48 and the away-flow edge 50 and the near-edge sections of the flow guidance surfaces 54a, 54b close to the in-flow edge 48 (where the near-edge sections are referenced by the reference symbols 74a, 74b) and the away-flow edge 50 are formed of a material having a relatively low ceramic content which has a relatively high mechanical strength. In consequence, a high degree of stability for the component at the in-flow edge 48 and the away-flow edge 50 is obtained, and in particular, the risk of break-away at these edges is reduced.

By contrast, those sections 78a, 78b of the flow guidance surfaces 54a, 54b which are remote from the edge are formed on the first region 64a and the second region 64b the respective materials of which have a relatively high ceramic content. In consequence, the component has a high abrasion and corrosion resistance in these surface sections which form the greater part of the flow guidance surfaces 54a, 54b.

Because of its high degree of mechanical strength, the middle layer 62 serves as the aerodynamic load bearing layer of the jet vane 60. Due to the fact that it extends transversely through the entire component from the in-flow edge 48 as far as the away-flow edge 50, it can increase the stability of the jet vane 60 to a very great extent.

The jet vane 60 can be manufactured as a whole, i.e. including the shaft 44, from fiber-ceramic material. In this case, the regions of fiber-ceramic material in the arrangement shown in FIG. 3 extend over the entire extent of both the vane 42 and the shaft 44.

Figure 5:
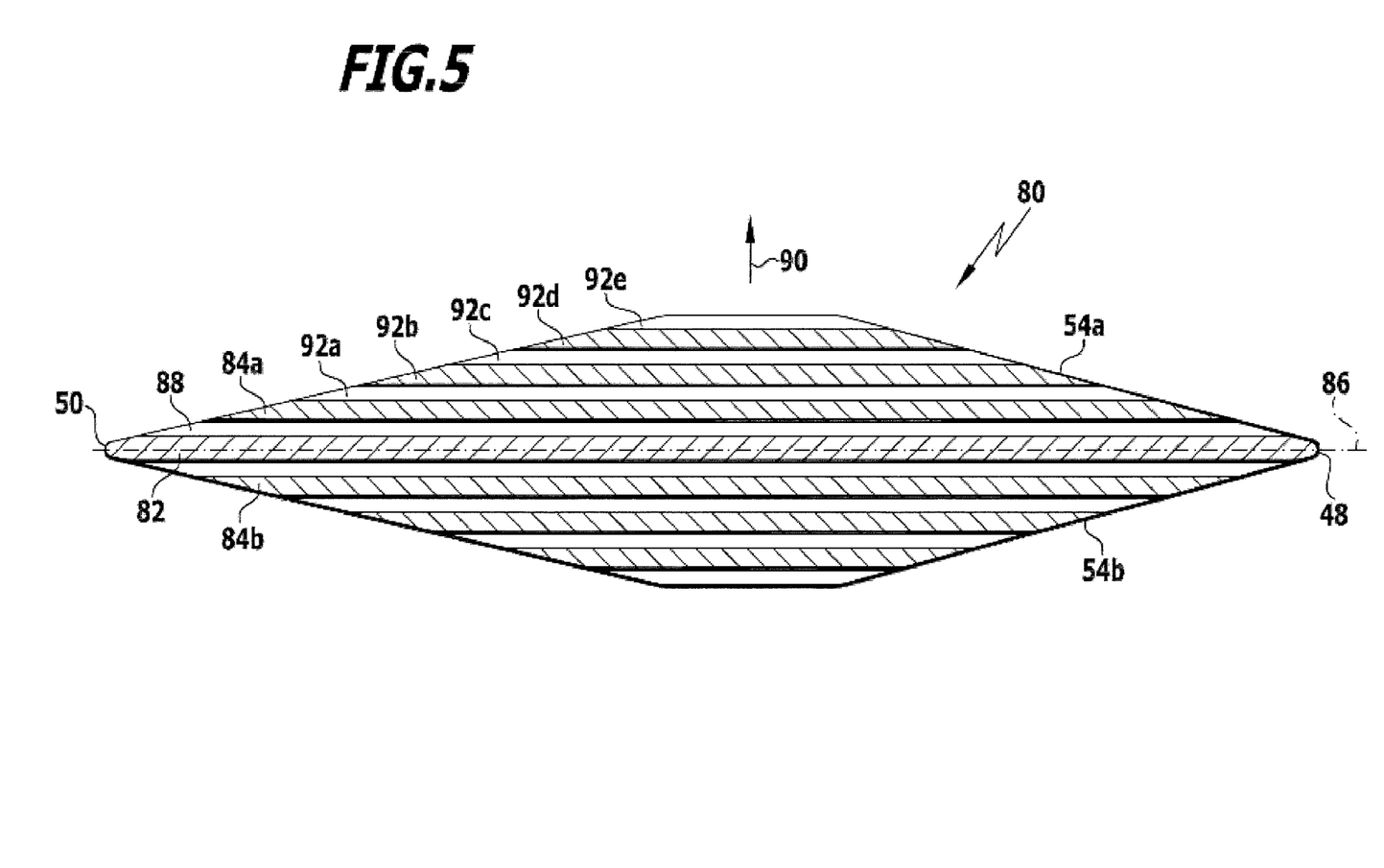
FIG. 5 shows a cross sectional view of a second exemplary embodiment of a jet vane in accordance with the invention which has a shape in accord with FIG. 2, along the line A-A in FIG. 2.

In FIG. 5, there is shown a cross sectional view along the line A-A in FIG. 2 of a second exemplary embodiment of a jet vane 80 in accordance with the invention which has the shape shown in FIG. 2. The elements already shown in FIG. 2 are designated in FIG. 5 by the same reference symbols as were used in FIG. 2.

Figure 4:
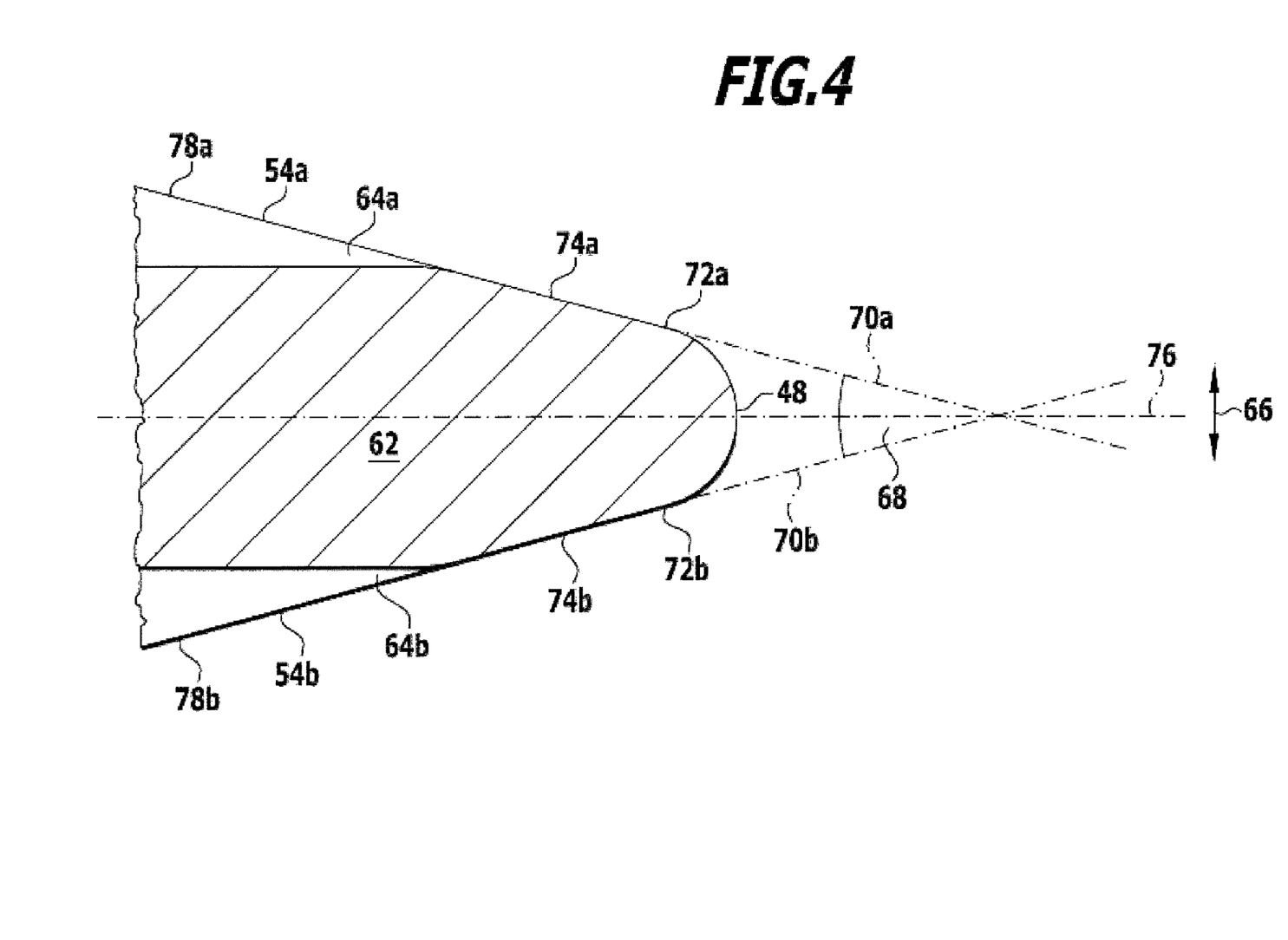
FIG. 4 shows an enlarged illustration of the region X comprising the in-flow edge from the cross sectional view in accord with FIG. 3.

In this second exemplary embodiment, a middle layer 82 is arranged in the same way as in the first exemplary embodiment shown in FIGS. 3 and 4. The in-flow edge 48 and the away-flow edge 50 are formed on the middle layer 82 over their entire longitudinal extent and their entire transverse extent. The respective near-edge sections of both flow guidance surfaces 54a, 54b of the jet vane 60 which border on the in-flow edge 48 and the away-flow edge 50 are also formed on the middle layer 82. The advantages already described in connection with the first exemplary embodiment thereby result.

In this second exemplary embodiment however, there are a number of further layers of fiber-ceramic material which are provided on the two sides of the middle layer 82. In particular, the first region 84a and the second region 84b, the fiber-ceramic materials of which have a higher ceramic content than that of the middle layer 82, are also in the form of layers. All the layers of the jet vane 80 run in a planar manner.

The jet vane 80 has a middle plane through which there extends the common bisector 86 of the edge angle of the in-flow edge 48 and the away-flow edge 50, said middle plane running in parallel with the longitudinal extent 52 of the in-flow edge 48 and the longitudinal extent of the away-flow edge 50. The construction of the jet vane 80 consisting of regions of fiber-ceramic material is mirror-symmetrical with respect to this middle plane. In the following, the layered structure of the jet vane 80 on the side of the middle layer 82 upon which the layer forming the first region 84a is arranged, is described in more detail. Due to the mirror symmetry of the jet vane 80, the same applies to the side of the middle layer 82 upon which the layer of the second region 84b is arranged.

The middle layer 82 and the layer of the first region 84a border directly on an intermediate layer 88 of fiber-ceramic material arranged therebetween, wherein the ceramic content of the fiber-ceramic material of the intermediate layer 88 lies between the ceramic content of the fiber-ceramic material of the middle layer 82 and the ceramic content of the fiber-ceramic material of the layer of the first region 84a. The ceramic content thus runs in graded manner from the middle layer 82 to the layer of the first region 84a thereby holding the layers closely together.

Following the layer of the first region 84a in the direction 90 of superposition of the layers of the fiber-ceramic material on the side thereof directed away from the middle layer 82, there are arranged outer layers 92 of fiber-ceramic material the respective fiber-ceramic material of which is selected in such a manner that alternating layers (84a; 92b; 92d) in the direction 90 of superposition have a relatively high ceramic content and layers (88; 92a; 92c; 92e) have a relatively low ceramic content. For example, five outer layers 92a, 92b, 92c, 92d, 92e are shown in FIG. 5.

Due to the alternating arrangement of a material having a relatively high and a material having a relatively low ceramic content in the direction 90 of superposition, the stability of the jet vane 80 in regard to the loads arising in the stream of hot gas 24 is increased. Advantageously, a large number of outer layers 92 is provided. This is made possible for a given extent of the jet vane 80 in the direction 90 of superposition by choosing a very small thickness for the individual layers of fiber-ceramic material.

The outer layer 92e located furthest from the middle layer 82 forms a covering layer for the component.

In the case of a preferred combination of materials, the middle layer 82 consists of a C/C-SiC-XB material, the layer of the first region 84a and the outer layers 92b, 92d having a relatively high ceramic content in the material thereof consist of a C/C-SiC-XD material and the intermediate layer 88 and the outer layers 92a, 92c, 92e having a relatively low ceramic content in the material thereof consist of a C/C-SiC-XT or a C/C-SiC-XC material.

The jet vane 60 including the shaft 44 can be manufactured as a whole from fiber-ceramic material. The layers of fiber-ceramic material in the arrangement shown in FIG. 5 then extend over the entire extent of both the vane 42 and the shaft 44.

Due to the combination of fiber-ceramic materials of differing ceramic content, the component in accordance with the invention, which may, in particular, be a jet vane, is optimized in regard to the resistance thereof with regard to the aerodynamic and abrasive loads arising in a stream of hot gas. Due to the fact that at least one acute-angled in-flow edge and/or away-flow edge is provided on the middle layer, the particular risk of break-away at this at least one in-flow edge and/or away-flow edge is reduced. This leads to a higher life time for the component.

The invention claimed is:

1. A component for use in streams of hot gas, comprising a first region of fiber-ceramic material;
a second region of fiber-ceramic material; and
a middle layer of fiber-ceramic material which is arranged between the first region and the second region;
wherein the fiber-ceramic material of the middle layer has a lower ceramic content than the fiber-ceramic material of the first region and the second region; and
wherein at least one of (i) at least one acute-angled in-flow edge and (ii) at least one acute-angled away-flow edge of the component is formed on the middle layer.

2. A component in accordance with claim 1, wherein at least one of (i) the at least one in-flow edge and (ii) at least one away-flow edge is formed on the middle layer over at least a part of its finite longitudinal extent.

3. A component in accordance with claim 2, wherein at least one of (i) the at least one in-flow edge and (ii) at least one away-flow edge is formed on the middle layer over its entire longitudinal extent.

4. A component in accordance with claim 1, wherein at least one of (i) the at least one in-flow edge and (ii) at least one away-flow edge has a finite transverse extent transverse to its longitudinal extent.

5. A component in accordance with claim 4, wherein at least one of (i) the at least one in-flow edge and (ii) at least one away-flow edge is formed on the middle layer over at least a part of its transverse extent.

6. A component in accordance with claim 5, wherein at least one of (i) the at least one in-flow edge and (ii) at least one away-flow edge is formed on the middle layer over its entire transverse extent.

7. A component in accordance with claim 6, wherein at least one of (i) the at least one in-flow edge and (ii) at least one away-flow edge is formed on the middle layer over its entire transverse extent and also a near-edge section of a flow guidance surface of the component bordering on at least one of the (i) at least one in-flow edge and (ii) at least one away-flow edge is formed on the middle layer.

8. A component in accordance with claim 1, wherein the running direction of the middle layer is parallel to the longitudinal extent of at least one of the (i) at least one in-flow edge and (ii) at least one away-flow edge.

9. A component in accordance with claim 1, wherein a bisector of an edge angle of at least one of (i) at least one in-flow edge and (ii) at least one away-flow edge lies within the component in the middle layer.

10. A component in accordance with claim 1, wherein a bisector of an edge angle of at least one of (i) at least one in-flow edge and (ii) at least one away-flow edge runs in a middle plane of the component which extends in parallel with the longitudinal extent of at least one of said at least one in-flow edge and away-flow edge.

11. A component in accordance with claim 10, wherein the construction of the component consisting of regions of fiber-ceramic material is mirror-symmetrical with respect to the middle plane.

12. A component in accordance with claim 1, wherein at least one of the first region and the second region are formed as layers of fiber-ceramic material.

13. A component in accordance with claim 1, wherein the component comprises at least one intermediate layer of fiber-ceramic material which is directly bounded on a first and a second side by a respective layer of fiber-ceramic material, wherein the ceramic content of the fiber-ceramic material of the intermediate layer lies between the ceramic content of the layer bordering on the first side and the ceramic content of the layer bordering on the second side.

14. A component in accordance with claim 1, wherein the component has a layered structure consisting of layers of fiber-ceramic material in which, in a direction of superposition of the layers, there are arranged, in an alternating manner, layers in each case of a fiber-ceramic material having a relatively high ceramic content and layers in each case of a fiber-ceramic material having a relatively low ceramic content.

15. A component in accordance with claim 1, wherein the component has a covering layer of fiber-ceramic material, and wherein the fiber-ceramic material of the covering layer has a higher ceramic content than the fiber-ceramic material of the middle layer.

16. A component in accordance with claim 1, wherein the fiber-ceramic material in at least one region is or comprises a carbide ceramic material.

17. A component in accordance with claim 1, wherein the fiber-ceramic material in at least one region contains C fibers or SiC fibers.

18. A component in accordance with claim 17, wherein the fiber-ceramic material in at least one region is or comprises a C/C-SiC material or a SiC/SiC material.

19. A component in accordance with claim 18, wherein the middle layer consists of a C/C-SiC-XB material.

20. A component in accordance with claim 18, wherein at least one of the first region and the second region consists of a C/C-SiC-XD material.

21. A component in accordance with claim 1, wherein the fiber-ceramic material in at least one region is made at least partially of a biomorphic material.

22. A component in accordance with claim 1, wherein the fiber-ceramic material in at least one region contains fibers which are arranged in the form of a felt, a fleece, a lap roll, a scrim, a woven fabric or a braiding.

23. A component in accordance with claim 1, said component being in the form of a jet vane.

* * * * *